2 Sheets—Sheet 2.

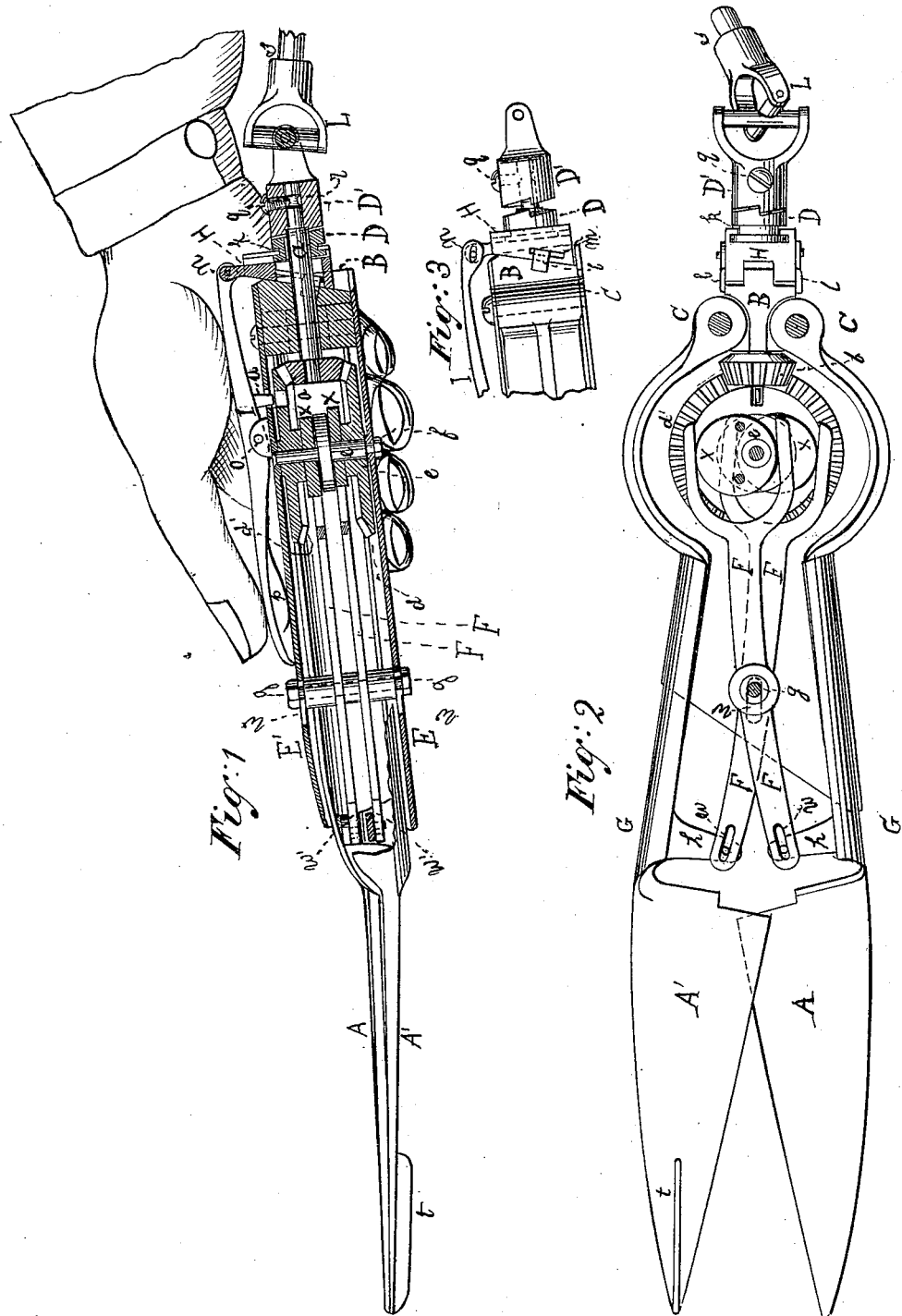

W. F. WUTERICH.
ANIMAL SHEARS.

No. 178,500. Patented June 6, 1876.

Witnesses:
Stephen E Legrand
Jno. M. Morse

Inventor:
William F. Wuterich

N. PETERS, PHOTO-LITHOGRAPHER, WASHINGTON, D. C.

UNITED STATES PATENT OFFICE.

WILLIAM F. WUTERICH, OF MERIDEN, CONNECTICUT.

IMPROVEMENT IN ANIMAL-SHEARS.

Specification forming part of Letters Patent No. 178,500, dated June 6, 1876; application filed March 28, 1876.

*To all whom it may concern:*

Be it known that I, WILLIAM F. WUTERICH, of Meriden, Connecticut, have invented certain Improvements in Animal-Shears, of which the following is a specification:

The object of my invention is to produce an apparatus by the use of which wool-growers can, with rapidity and ease, remove from the sheep their fleeces of wool, and that with comparative safety to the valuable wool-producing animals.

Figure 4:
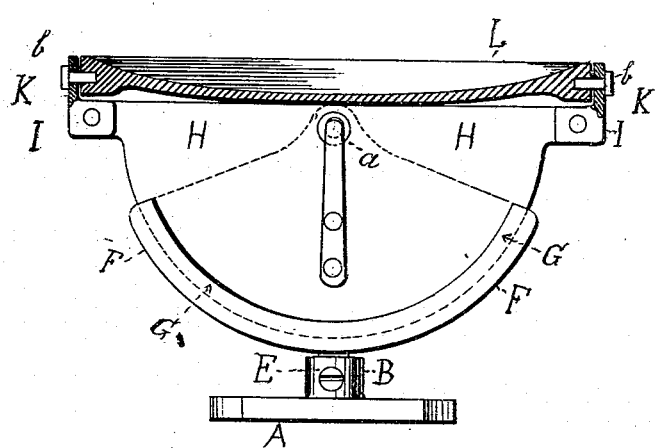
Figure 5:
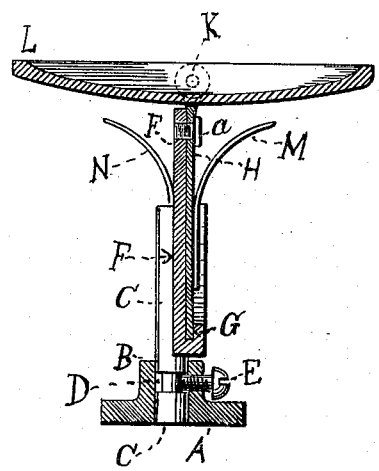
Figure 6:
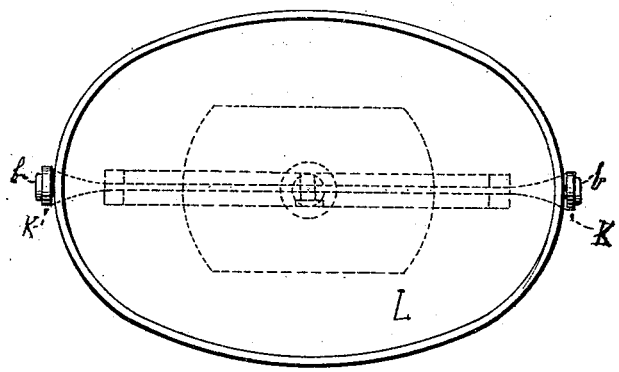

In the accompanying drawings, making part of this specification, Figure 1 is a vertical section through the center of the shears which I have improved. Fig. 2 is a bird's-eye or top view of the same when they are turned the lower side up, and the plate E removed to show the interior devices. Fig. 3 is an edge view of the rear end of the shears, showing the devices for connecting and disconnecting the same with the power which operates the shears. Fig. 4 is a vertical longitudinal section through the center of the table on which the sheep is supported while being shorn. Fig. 5 is a transverse vertical section of the said table. Fig. 6 is a top view of the same.

In order to enable others to make and use my invention, I will now proceed to describe the same.

I construct the cutting-blades A and A' very much in the usual manner; but instead of having them connected together at their rear ends, behind what may be called the "curved handles" G G' of said blades, by a semicircular spring-plate, as is common in the old hand-shears, I connect them, by what may be called a "knuckle-joint," to the block B, as seen at C, Figs. 2 and 3. Through the block B passes the shaft or spindle a, Fig. 1, on the outer end of which are placed the clutches D and D'. E and E' are two plates, which are attached to, and extend from, the block B forward to near the front end of the curved handles G G; and the edges of these plates are, toward their front ends, bent or curved down over the curved handles G and G, and are of a width sufficient to allow the said handles to open freely to their full extent inside of their curved edges, and these plates E and E' constitute the support of the pins e and g, upon which the wheels d and d', with their eccentrics x and x and the levers F and F, are placed. On the inner end of the spindle a is placed the bevel-pinion b, said pinion working between, and gearing with, the two bevel-wheels d and d'. Said wheels are placed and revolve upon the stationary pin e. This pin passes through the plates E and E', being secured to them in any suitable way, as by a nut, as seen at f, Fig. 1. On the inner faces of the wheels d and d' are rigidly placed the eccentrics x and x, and they are so placed that their respective peripheries, or edges farthest from their centers, and the pin e, upon which they work, will always be opposite to each other when the blades A A of the shears are entirely open or entirely closed. On these eccentrics are placed the forked ends of the levers F and F. Said levers, at or near their centers, work on the pin g, as a fulcrum, which pin, as before explained, is held in place by the plates E and E'. (See f, Fig. 1.) Attached to what I call the handles of the blades A and A', and which are marked G G, are studs h h, near the ends of which are placed pins, which work in slots in the forward ends of the levers F and F.

On the blade A' is placed a guard, t, Figs. 1 and 2. This guard may be made in any desired form — such as wire or rib — and it may be attached to the blade in any convenient manner. Soldering will answer the purpose. This guard is to prevent the points of the blades from piercing the sheep and cutting its hide, while it is being shorn.

The clutch D is formed with circumferential groove, as seen at k in Figs. 1 and 2. This clutch is placed on the spindle a in such a way as to allow it to move freely longitudinally thereon; but by means of a feather placed in a spline in said spindle, or any other suitable device, it is prevented from turning or revolving unless the spindle a revolves with it. On the block B is placed the shifter H, which is made wedge-shaped. (See Figs. 1 and 2.) This shifter is held on the block B by the hooks l, Figs. 2 and 3. These hooks being fastened to the block B, and their ends turned inward into the slots m, Fig. 3, hold the shifter H to said block, and allow it to freely slide thereon, said slots being much longer than the width of the hooks. The shifter H is formed with two flanges, turning inward and entering the groove in the clutch D, Figs. 1 and 2. This shifter, at its upper end, is attached to the thumb or hand lever I, as seen at $n$, Figs. 1 and 2. The said lever I is so attached to the plate E′ by means of lugs and pin (shown at $o$, Fig. 1) as to allow it to freely oscillate on said pin. To lever I is attached the spring $p$, Fig. 1, in such a way as to press against the plate E′, and keep the end of the lever, to which it is attached, pressed off from said plate, except when it is forced down thereto by the pressure of the hand or thumb of the operator. On the opposite end of the lever I from the said spring $p$ is a stud, $u$, Fig. 1. This stud passes down through a mortise in the plate E′, and its length is such that when the lever is pressed by the thumb or hand into the position seen in Fig. 1 its lower end will be even with the back of the wheel $d'$. Now, as this stud would rest on the back of said wheel it would hold the lever I in the position shown in Fig. 1, and thus the clutches D and D′ would be held in contact by the wedge-shaped shifter H, and the shears would be kept in motion as long as the clutch D′ continued to revolve whether the pressure of the thumb or hand continued or not; but there being a mortise, $v$, formed in the wheel $d'$, into which the stud $u$ drops, when said wheel turns, until the said mortise comes under the stud, and the thumb or hand pressure is removed from the lever I; then the spring $p$ raises that and depresses the other end of the lever, and the shifter H goes down with it; and thus the clutch D is disconnected from D′, and the shears stop operating until the pressure on the lever I is renewed, which will raise the wedge-shaped shifter H, and connect the clutches D and D′, when the shears will immediately commence to operate. The mortise $v$ in the wheel $d'$ is so located that it will come under the stud $u$ only when the blades A and A′ are closed; and if the pressure on the lever I is removed when the shears are more or less open the stud $u$ will rest on the back of the wheel $d'$, and prevent that end of the lever from being depressed, and thus the shifter continues to hold the clutches D and D′ in contact, and the motion of the shears continues until the mortise $v$ of the wheel $d'$ comes under the stud $u$, when it instantly drops therein, thus stopping the motion of the shears, and from the construction and arrangement of the said devices it is apparent that the motion of the shears can stop only when the blades A and A′ are closed, and thus they are less liable to do or receive injury.

The clutch D′ is placed on the outer end of the spindle $a$, and just far enough from the clutch D to allow it to revolve freely on the said spindle without engaging with said clutch D except when the latter is forced out from the block B by the shifter H. This clutch D′ is secured in its place, longitudinally, on the spindle $a$ by means of a set-screw, $q$, Figs. 1, 2, and 3, the inner end of which passes into a groove in the spindle $a$, as shown at $r$, Fig. 1, thus allowing the clutch D′ to revolve freely on said spindle without moving it except when its fellow clutch D is forced outward on it, and in contact with D′ by means of the shifter H and lever 1. This shifter H being, as before-explained, wedge-shaped, and having flanges turning inward and entering the groove in the clutch D, as seen in Figs. 1, 2, and 3, when it is drawn up by the lever I must force out the said clutch, and thus it is made to engage with its fellow clutch D′ and put the shears in motion, and when the shifter H is allowed to go down it draws the clutch D away from its fellow and the shears stop operating. Attached to the clutch D′ is the universal joint L, Figs. 1 and 2, and to this joint may be attached at $s$, Figs. 1 and 2, any desired kind of a flexible device for connecting it with the propeller, by which the desired motion is given to the joint L and spindle $a$, and this, whether hand, steam, horse, or any other power is used to operate the shears. It being desirable sometimes to have the blades A and A′ of the shears to open very much less than their full capacity in order the more conveniently to shear around the legs and neck of the animal I so construct them that the fulcrum-pin $g$, on which the levers F F work, can easily be moved forward toward the blades A and A′. The slots $w$ $w$ in the plates E and E′, Figs. 1 and 2, in which the ends of the fulcrum-pin $g$ are placed are formed to admit of said motion, and as this fulcrum-pin $g$ would carry with it the levers F F they are provided with slots $w'$ $w'$ to allow them to slip forward on the pins of the studs $h$ $h$, on which they work. The open forked ends of said levers allow them to move forward on the eccentrics $x$ $x$ without difficulty. From this description of the construction of the levers F F and the parts in connection therewith it is clear that as the fulcrum-pin $g$ is moved forward toward the blades A and A′, the back or forked ends of said levers will virtually be lengthened, and the forward ends correspondingly shortened, and of course their opening motion lessened accordingly, and this decrease of motion will be in proportion to the distance the fulcrum-pin $g$ is moved, and the slots $w$ and $w'$ may be made so long that the said pin $g$ may be moved so far that there will be very little motion to the blades A and A′, and thus it may be made unnecessary to provide, as has been done, for stopping and starting the motion of the shears by means of the lever I, spring $p$, stud $u$, shifter H, and clutches D and D′, for the fulcrum-pin $g$ may be moved forward so far that very little motion will be conveyed to the blades A and A′, and, therefore, no inconvenience or injury will result from this continuous motion, and this arrangement would materially simplify the machine and lessen the cost of construction.

The table upon which the sheep to be shorn is placed is shown in Figs. 4, 5, and 6. In Figs. 4 and 5 is seen the base-plate A, with a boss, B, standing up from its center. In this boss is a hole for the reception of the supporting-spindle C. Near to the lower end of the said spindle is formed a groove, D', into which the inner end of the screw E, which is placed in the boss passes. (See Fig. 5.) This screw is for the purpose of holding the spindle C in the boss B, and then allowing it to turn freely therein. To the spindle C is rigidly attached the semicircular plate F. This plate has, near its periphery, a groove or hook, G, Figs. 4 and 5. At the point where radial lines of this plate would meet is placed a pin or center-screw, $a$, Figs. 1 and 2, and on this pin is suspended the semicircular plate H, which is so made that its periphery will neatly fit into the groove G of the plate F, and work freely therein, allowing it to oscillate easily upon the pin $a$. At the two opposite extremes of this plate are formed lugs I I, and on these lugs are formed upright flanges or ears K K, Figs. 4, 5, and 6. Through these ears pass pins $b$ $b$, and on these pins is suspended a dish-like table, L, which freely oscillates on said pins. Upon this table is placed the sheep to be shorn. Upon the plates H and F are placed the springs or braces M and N, respectively. These springs are for the purpose of arresting the lateral oscillations of the table at the desired point, they being bent more or less to effect that object. And this whole stand or table is held in any desired location by securing the base-plate A thereof to any desired foundation which may be firm enough to steadily sustain it.

Now, it is evident, from the above description of the said stand or table, that the top of the same will revolve and oscillate in any desired direction, so that the animal which is placed on it to be shorn can with facility be turned or moved in any desired way, in order to facilitate the operation of shearing.

The operation of the above-described apparatus will be as follows, viz: The animal to be shorn being placed upon the table L, and the driving machinery, of whatever kind it may be, being set in motion, and said motion being conveyed to the universal joint L, or directly to the end of the spindle $a$, if the clutches D and D' and lever I are not used, by means of any flexible device or in any suitable way. (See Figs. 1 and 2.) But if said clutches and lever be used, the clutch D' will be revolved, but it not being in contact with clutch D, the shears will not yet be put in motion; but when it is desired to put them in operation the operator gripes them by the plates E and E', (the edges of which are turned or curved down over the handles G G, as before described,) and presses down, by the thumb or hand, the front end of the lever I, which raises the opposite end, and with it the shifter H, the inner flanges of which enter the groove $k$ of the clutch D, Figs. 1 and 2, forcing it out until it engages with its fellow D', when the latter, and the spindle $a$ on which it is placed, and the pinion $b$ on the inner end of said spindle, immediately commence to revolve. This pinion $b$, gearing with the wheels $d$ and $d'$, revolves them, and the eccentrics $x$ and $x$, being rigidly attached to them, revolve with them, thus operating the levers F and F, in the forks of which they work, and said levers are thus made to oscillate on their fulcrum-pin $g$, and their front ends move correspondingly to and from each other, and the studs $h$ $h$, having pins in them, which work in slots in said levers F F are moved with them, and said studs being attached to the handles G G of the blades A and A', the latter are operated, and will continue to be operated as long as the pressure on lever I is maintained and the main power or motor is kept in motion.

But if, as before mentioned, the use of the clutches D and D', the shifter H, and lever I is dispensed with, and the propelling power attached directly to the spindle $a$, then the operator, instead of pressing on a lever to start the shears in motion, will only have to move the fulcrum-pin $g$ back to the rear end of the slots in the plates E and E, which virtually shortens the rear and lengthens the front ends of the levers F and F, and, consequently, the opening and closing motion of the blades A and A' are increased to their greatest capacity; and, when it is desired to decrease said motion of the blades, the operator will move said fulcrum-pin $g$ forward as far as may be necessary to produce the desired motion; and all this may readily be done without stopping the motion of the spindle $a$ of the shears.

The operator may often desire to reduce the opening motion of the blades A and A', in order to more conveniently shear around the legs and neck of the animal, and, by moving the fulcrum-pin $g$, as above stated, he may have the desired motion; and, if the slots $w$ $w$ in plates E and E', and in the forward ends of the levers F and F, as seen at $w'$ $w'$ in Fig. 2, are made long enough, the forward movement of the fulcrum-pin $g$ may be so great as to almost, if not entirely, stop the opening and closing motion of the shears or blades A and A', and thus render it unnecessary to entirely stop their motion by means of the devices D D', shifter H, and lever I.

From all of the above it will be seen that the shears, improved as above described, can be very easily operated, and with great rapidity, and that, too, without the continuous and tiresome, and also comparatively slow, opening and closing of the hand of the operator, which is necessary to operate the common shears; and thus he has only to hold the shears steadily in his hand, and apply them properly to the sheep which he is shearing, and the motion being given to them, as described, and with any desired rapidity, the work of shearing can be accomplished very nicely, as well as very rapidly, and with comparative ease to the operator.

Having fully described the construction and operation of my improvement in shears for shearing animals in the above terms, what I claim, and desire to secure by Letters Patent, is—

1. The combination of the clutches D and D', the shifter H, and block B, substantially as and for the purpose set forth.

2. The combination of the shifter H, lever I, spring $p$, stud $u$, and wheel $d'$, with its mortise $v$, substantially as and for the purpose set forth and described.

3. The combination of the wheel $d'$, with its mortise $v$, the wheel $d$, eccentrics $x$ and $x$, and levers F and F, as and for the purpose set forth.

4. The combination of the eccentrics $x\ x$, the forked and slotted levers F F, and the studs $h\ h$, with their pins working in the slots of the forward ends of the said levers F F, all substantially as and for the purpose set forth.

5. The combination of the blades A and A', handles G and G', block B, and knuckle-joint C, all substantially as shown and described, and for the purpose set forth.

6. The combination of the blades A A' with the guard wire or rib $t$ attached to the blade A', all as shown and described, and for the purpose set forth.

7. The combination of the levers F F, with their slots $w$ and $w$ and $w'$ and $w'$, and the movable fulcrum-pin $g$, as and for the purpose set forth.

8. The combination, in a table or stand, of the plate A, spindle C, and plate F, all as seen in Figs. 4 and 5 in the accompanying drawings, substantially as and for the purpose set forth.

9. The combination, in a table or stand, of the spindle C, plate F, and plate H, all as shown in Figs. 4 and 5 in the accompanying drawings, substantially as and for the purpose set forth.

10. The combination, in a table or stand, of the plate F, plate H, and the dish-formed top L, all as seen in Figs. 4 and 5 in the accompanying drawings, substantially as and for the purpose set forth.

11. The combination, in a table or stand, of the spindle C, plate F, plate H, springs or braces M and N, and top L, as shown in Figs. 4 and 5 of the accompanying drawings, all as and for the purpose set forth and described.

WILLIAM F. WUTERICH.

Witnesses:
STEPHEN E. LEGRAND,
JNO. M. MORSE.